(12) United States Patent
Gandhi et al.

(10) Patent No.: US 8,498,626 B1
(45) Date of Patent: Jul. 30, 2013

(54) SERVICE-BASED ACCESS FOR ENTERPRISE PRIVATE NETWORK DEVICES TO SERVICE PROVIDER NETWORK SERVICES

(71) Applicant: Verizon Patent and Licensing, Inc., Basking Ridge, NJ (US)

(72) Inventors: Ashish R. Gandhi, Brentwood, CA (US); Arvind Aggarwal, Danville, CA (US); Oleg Berzin, Huntingdon Valley, PA (US); Jean G. Dodard, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/710,051

(22) Filed: Dec. 10, 2012

(51) Int. Cl.
*H04M 3/42* (2006.01)
(52) U.S. Cl.
USPC ........................................ 455/414.1; 709/228
(58) Field of Classification Search
USPC ......... 455/413, 414.1, 414.2, 414.3; 709/228, 709/225, 227
See application file for complete search history.

(56) References Cited

U.S. PATENT DOCUMENTS 6,665,718 B1 * 12/2003 Chuah et al. .................. 709/225
7,702,317 B2 * 4/2010 Montelius .................. 455/414.1

\* cited by examiner

*Primary Examiner* — Phuoc Doan

(57) ABSTRACT

A system is configured to receive, from an enterprise device, a request to access a network domain, and is configured to determine whether the network domain is associated with a wireless service provider service. Based on determining that the network domain is not associated with the wireless service provider service, the system is configured to route the request to a private network associated with the enterprise device. Based on determining that the network domain is associated with the wireless service provider service, the system is configured to route the request to a domain name system server associated with the wireless service provider, receive a domain name system response to the request, the domain name system response identifying a network address, and route the domain name system response to the enterprise device.

20 Claims, 9 Drawing Sheets

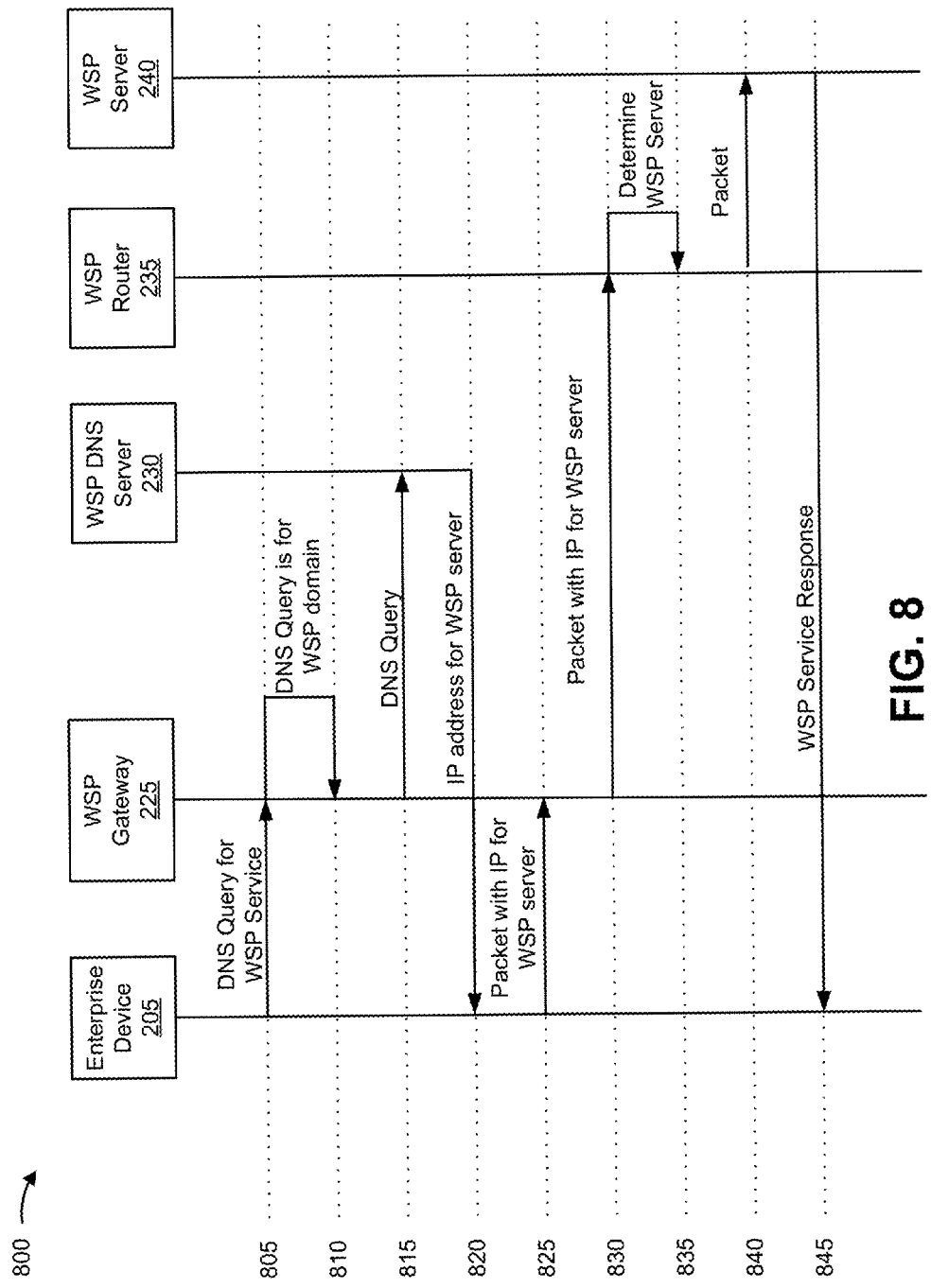

SERVICE-BASED ACCESS FOR ENTERPRISE PRIVATE NETWORK DEVICES TO SERVICE PROVIDER NETWORK SERVICES

BACKGROUND

A wireless service provider may provide access to a private network of an enterprise, such as an enterprise local area network (LAN). Enterprise devices (e.g., smart phones of enterprise employees) may use the wireless service provider's network to access the enterprise network. An enterprise administrator may control services, devices, and websites that may be accessed by the enterprise devices.

BRIEF DESCRIPTION OF THE DRAWINGS

FIG. 8 is a diagram of an example call flow for providing a wireless service provider (WSP service to an enterprise device.

DETAILED DESCRIPTION OF PREFERRED EMBODIMENTS

The following detailed description of example implementations refers to the accompanying drawings. The same reference numbers in different drawings may identify the same or similar elements.

A wireless service provider (WSP) may provide access to a private network of an enterprise, such as an enterprise local area network. Enterprise devices (e.g., mobile devices, such as smart phones of enterprise employees) may use the wireless service provider network to access the enterprise network. However, services offered by the wireless service provider may be inaccessible by the enterprise devices because the enterprise network may be incapable of routing packets back to the wireless service provider network. Implementations described herein provide a means for enterprise devices to access services provided via the wireless service provider network.

The term enterprise, as used herein, is intended to be broadly construed to include a business, an organization, a government agency, an enterprise device, a related group of users and/or devices, etc.

Figure 1A:
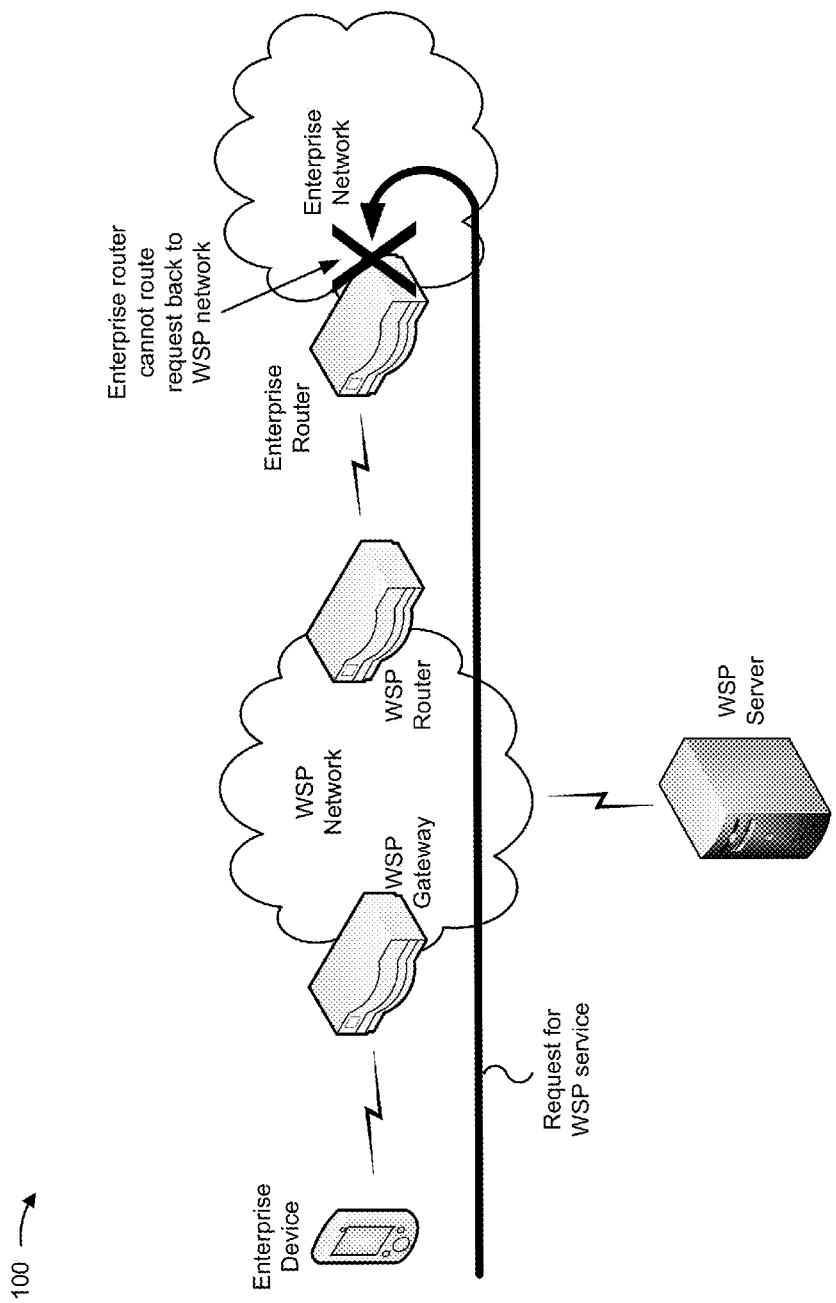
FIGS. 1A and 1B are diagrams of an overview of an example implementation described herein.
Figure 1B:
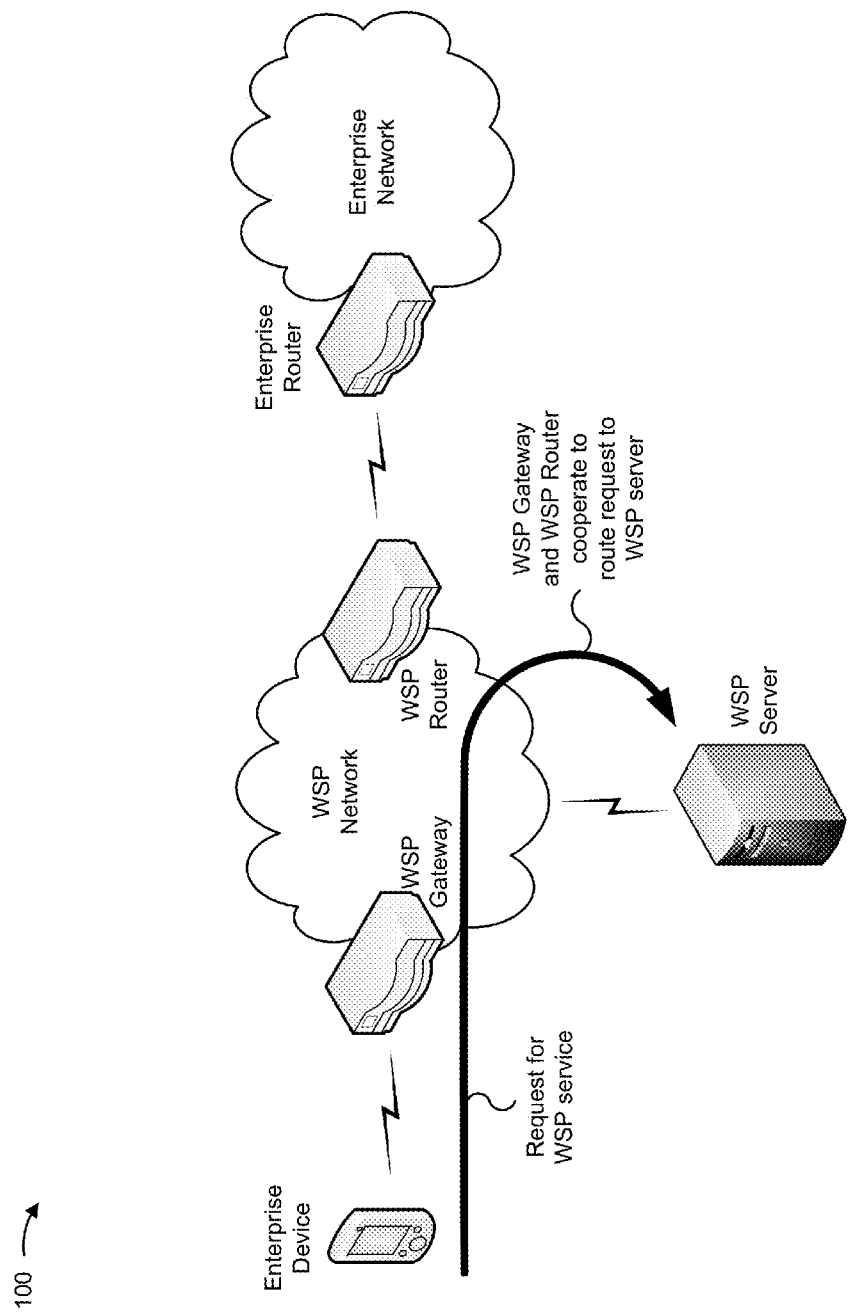

FIGS. 1A and 1B are diagrams of an overview of an example implementation 100 described herein. As shown in FIG. 1A, implementation 100 may include an enterprise device, such as a smart phone, a wireless service provider (WSP) network, such as a cellular network, and an enterprise network, such as a private network for a particular enterprise. The WSP network may include a WSP gateway that provides access to the WSP network, a WSP router that routes traffic on the WSP network, and a WSP server that provides a WSP service, such as a voicemail service, a text messaging service, a location service, etc. The enterprise network may include an enterprise router that routes traffic on the enterprise network.

As further shown in FIG. 1A, the enterprise device may request a WSP service provided by the WSP server. The request may be received by the WSP gateway, routed by the WSP gateway to the WSP router, and routed by the WSP router to the enterprise router. The WSP gateway and WSP router may automatically (e.g., by default) route all traffic received from the enterprise device to the enterprise network via the enterprise router. The enterprise router may be unable to route the request for the WSP service back to the WSP network. Thus, the WSP server may not be capable of providing the WSP service to the enterprise device.

As shown in FIG. 1B, rather than automatically routing all traffic received from the enterprise device to the enterprise router, the WSP gateway and WSP router may analyze incoming requests from the enterprise device to determine whether the request is for a WSP service. When the request is for the WSP service, the WSP gateway and WSP router may cooperate to route the request to a WSP server that provides the WSP service. Thus, the enterprise device may receive services offered by the WSP server.

Figure 2:
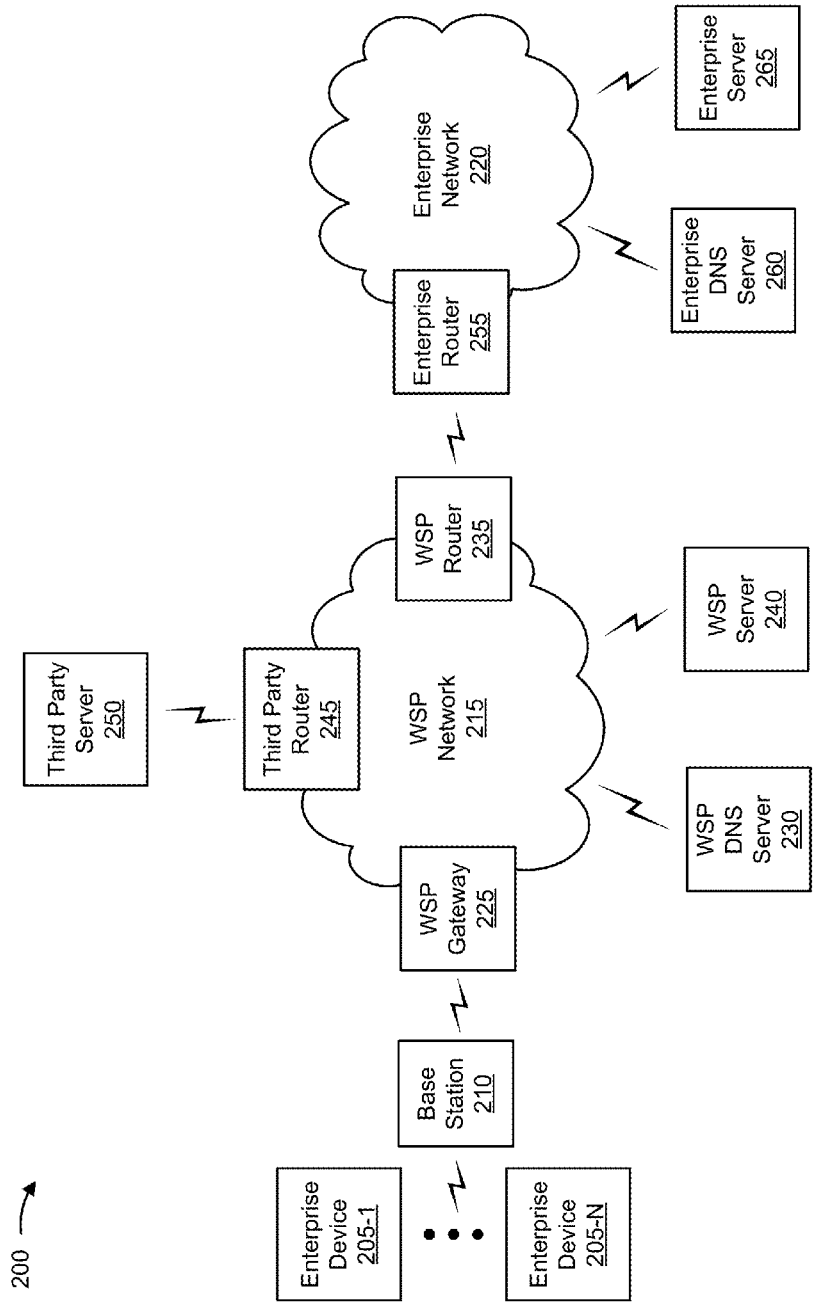
FIG. 2 is a diagram of an example environment in which systems and/or methods described herein may be implemented.

FIG. 2 is a diagram of an example environment in which systems and/or methods described herein may be implemented. As shown in FIG. 2, environment 200 may include one or more enterprise devices 205-1 through 205-N (N≧1) (hereinafter referred to collectively as "enterprise devices 205," and individually as "enterprise device 205"), a base station 210, a wireless service provider (WSP) network 215, an enterprise network 220, a WSP gateway 225, a WSP domain name system (DNS) server 230, a WSP router 235, a WSP server 240, a third party router 245, a third party server 250, an enterprise router 255, an enterprise DNS server 260, and an enterprise server 265.

Enterprise device 205 may include a device capable of accessing enterprise network 220 via WSP network 215. For example, enterprise device 205 may include a mobile computing device (e.g., a laptop computer, a tablet computer, a handheld computer, a smart phone, a radiotelephone, a gaming device, an automatic teller machine, etc.) or a similar device. In some implementations, enterprise device 205 may include a device capable of accessing a wireless network (e.g., WSP network 215) via base station 210 (e.g., via an air interface). Additionally, or alternatively, enterprise device 205 may be registered and/or authenticated for access to enterprise network 220.

Base station 210 may include one or more devices that receive, process, and/or transmit traffic, such as audio, video, text, and/or other data, destined for and/or received from enterprise device 205. In some implementations, base station 210 may include an evolved node B (eNB), associated with a long term evolution (LTE) network, that receives traffic from and/or sends traffic to WSP network 215 (e.g., via a packet data network gateway and/or a serving gateway). Additionally, or alternatively, one or more base stations 210 may be associated with a radio access network that is not associated with the LTE network. Base station 210 may send traffic to and/or receive traffic from user device 205 via an air interface.

WSP network 215 may include a wireless network capable of transmitting traffic between enterprise device 205 and enterprise network 220. For example, WSP network 215 may transmit traffic to and/or receive traffic from enterprise device 205 via base station 210. Additionally, or alternatively, WSP network 215 may transmit traffic to and/or receive traffic from enterprise network 220 via WSP router 235. WSP network 215 may include, for example, a cellular network, a public land mobile network (PLMN), a radio access network (RAN), an LTE network, a second generation (2G) network, a third generation (3G) network, a fourth generation (4G) network, a fifth generation (5G) network, and/or another type of wireless network, or a combination of wired and wireless networks. In some implementations, WSP network 215 may include an evolved packet system that includes an LTE network and/or an evolved packet core that operate based on a third generation partnership project (3GPP) wireless communication standard.

Enterprise network 220 may include one or more wired and/or wireless private networks. For example, enterprise network 220 may include a local area network (LAN), a wide area network (WAN), a metropolitan area network (MAN), an intranet, and/or another type of private network.

WSP gateway 225 may include one or more traffic transfer devices. For example, WSP gateway 225 may include a gateway, a router, a switch, a firewall, a hub, a bridge, a modem, a network interface card, an optical add-drop multiplexer, a server (e.g., a virtual server, a proxy server, etc.), and/or another device capable of transmitting, receiving, transferring, and/or processing network traffic. In some implementations, WSP gateway 225 may receive traffic from and/or transmit traffic to base station 210, WSP DNS server 230, and/or WSP router 235.

WSP DNS server 230 may include one or more server devices, or similar devices. In some implementations, WSP DNS server 230 may receive a DNS query for a WSP service from enterprise device 205, and may respond to the DNS query by transmitting a network address to enterprise device 205. In some implementations, base station 210 and/or WSP gateway 225 may route the request and/or the response between enterprise device 205 and WSP DNS server 230.

WSP router 235 may include one or more traffic transfer devices. For example, WSP router 235 may include a router, a switch, a firewall, a hub, a bridge, a gateway, a modem, a network interface card, an optical add-drop multiplexer, a server (e.g., a virtual server, a proxy server, etc.), and/or another device capable of transmitting, receiving, transferring, and/or processing network traffic. In some implementations, WSP router 235 may include an edge device (e.g., an edge router) that transfers and/or translates information, via a secure connection, between WSP network 215 and enterprise network 220. Additionally, or alternatively, WSP router 235 may receive traffic from and/or transmit traffic to WSP gateway 225, WSP server 240, third party router 245, and/or enterprise router 255. In some implementations, WSP router 235 may transfer traffic to and/or from an internet gateway that provides internet access (not shown).

WSP server 240 may include one or more server devices, or similar devices. In some implementations, WSP server 240 may provide WSP services (e.g., voice services, location services, text messaging services, voicemail services, network application programming interface services, etc.) to devices with access to WSP network 215. For example, WSP server 240 may receive a request for a WSP service from enterprise device 205, and may respond to the request by providing the WSP service to enterprise device 205. In some implementations, base station 210, WSP gateway 225, and/or WSP router 235 may route the request and/or the response between enterprise device 205 and WSP server 240.

Third party router 245 may include one or more traffic transfer devices. For example, third party router 245 may include a router, a switch, a firewall, a hub, a bridge, a gateway, a modem, a network interface card, an optical add-drop multiplexer, a server (e.g., a virtual server, a proxy server, etc.), and/or another device capable of transmitting, receiving, transferring, and/or processing network traffic. In some implementations, third party router 245 may include an edge device (e.g., an edge router) that transfers and/or translates information between WSP network 215 and a third party network (not illustrated). Additionally, or alternatively, third party router 245 may receive traffic from and/or transmit traffic to WSP router 235 and/or third party server 250.

Third party server 250 may include one or more server devices, or similar devices. In some implementations, third party server 250 may provide third party services (e.g., mapping services, search services, social media services, etc.) to devices with access to a third party network (not illustrated). For example, third party server 250 may receive a request for a third party service from enterprise device 205, and may respond to the request by providing the third party service to enterprise device 205. In some implementations, base station 210, WSP gateway 225, WSP router 235, and/or third party router 245 may route the request and/or the response between enterprise device 205 and third party server 250.

Enterprise router 255 may include one or more traffic transfer devices. For example, enterprise router 255 may include a router, a switch, a firewall, a hub, a bridge, a gateway, a modem, a network interface card, an optical add-drop multiplexer, a server (e.g., a virtual server, a proxy server, etc.), and/or another device capable of transmitting, receiving, transferring, and/or processing network traffic. In some implementations, enterprise router 255 may include an edge device (e.g., an edge router) that transfers and/or translates information between enterprise network 220 and WSP network 215. Additionally, or alternatively, enterprise router 255 may receive traffic from and/or transmit traffic to WSP router 235, enterprise DNS server 260, and/or enterprise server 265. In some implementations, enterprise router 255 may transfer traffic to and/or from an internet gateway that provides internet access (not shown).

Enterprise DNS server 260 may include one or more server devices, or similar devices. In some implementations, enterprise DNS server 260 may receive a DNS query for an enterprise service from enterprise device 205, and may respond to the DNS query by transmitting a network address to enterprise device 205. In some implementations, base station 210, WSP gateway 225, WSP router 235, and/or enterprise router 255 may route the request and/or the response between enterprise device 205 and enterprise DNS server 260.

Enterprise server 265 may include one or more server devices, or similar devices. In some implementations, enterprise server 265 may provide enterprise services (e.g., access to enterprise email, human resources applications, time reporting applications, internal job search applications, training applications, access to information on an enterprise intranet, such as product information, enterprise processes or procedures, etc.) to devices with access to enterprise network 220 (e.g., enterprise devices 205). For example, enterprise server 265 may receive a request for an enterprise service from enterprise device 205, and may respond to the request by providing the enterprise service to enterprise device 205. In some implementations, base station 210, WSP gateway 225, WSP router 235, and/or enterprise router 255 may route the request and/or the response between enterprise device 205 and enterprise server 265.

The number of devices and networks shown in FIG. 2 is provided for explanatory purposes. In practice, environment 200 may include additional devices and/or networks, fewer devices and/or networks, different devices and/or networks, or differently arranged devices and/or networks. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
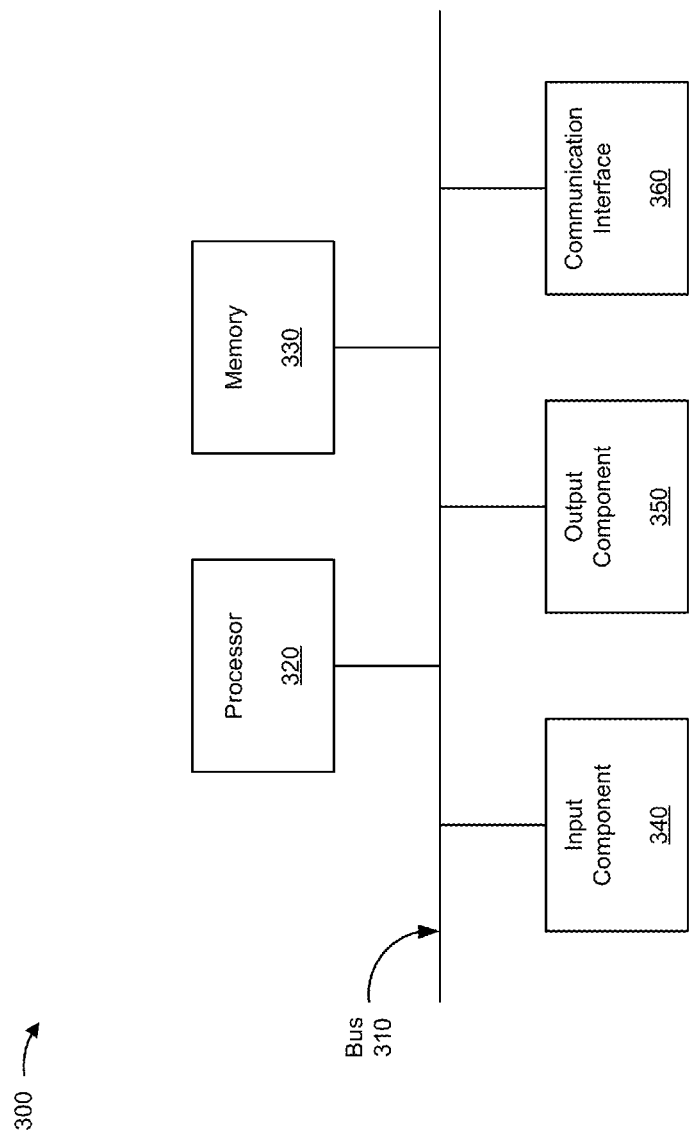
FIG. 3 is a diagram of example components of one or more devices of FIG. 2.

FIG. 3 is a diagram of example components of a device 300. Device 300 may correspond to enterprise device 205, base station 210, WSP gateway 225, WSP DNS server 230, WSP router 235, WSP server 240, third party router 245, third party server 250, enterprise router 255, enterprise DNS server 260, and/or enterprise server 265. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of enterprise device 205, base station 210, WSP gateway 225, WSP DNS server 230, WSP router 235, WSP server 240, third party router 245, third party server 250, enterprise router 255, enterprise DNS server 260, and/or enterprise server 265 may include one or more devices 300 and/or one or more components of device 300.

Figure 4:
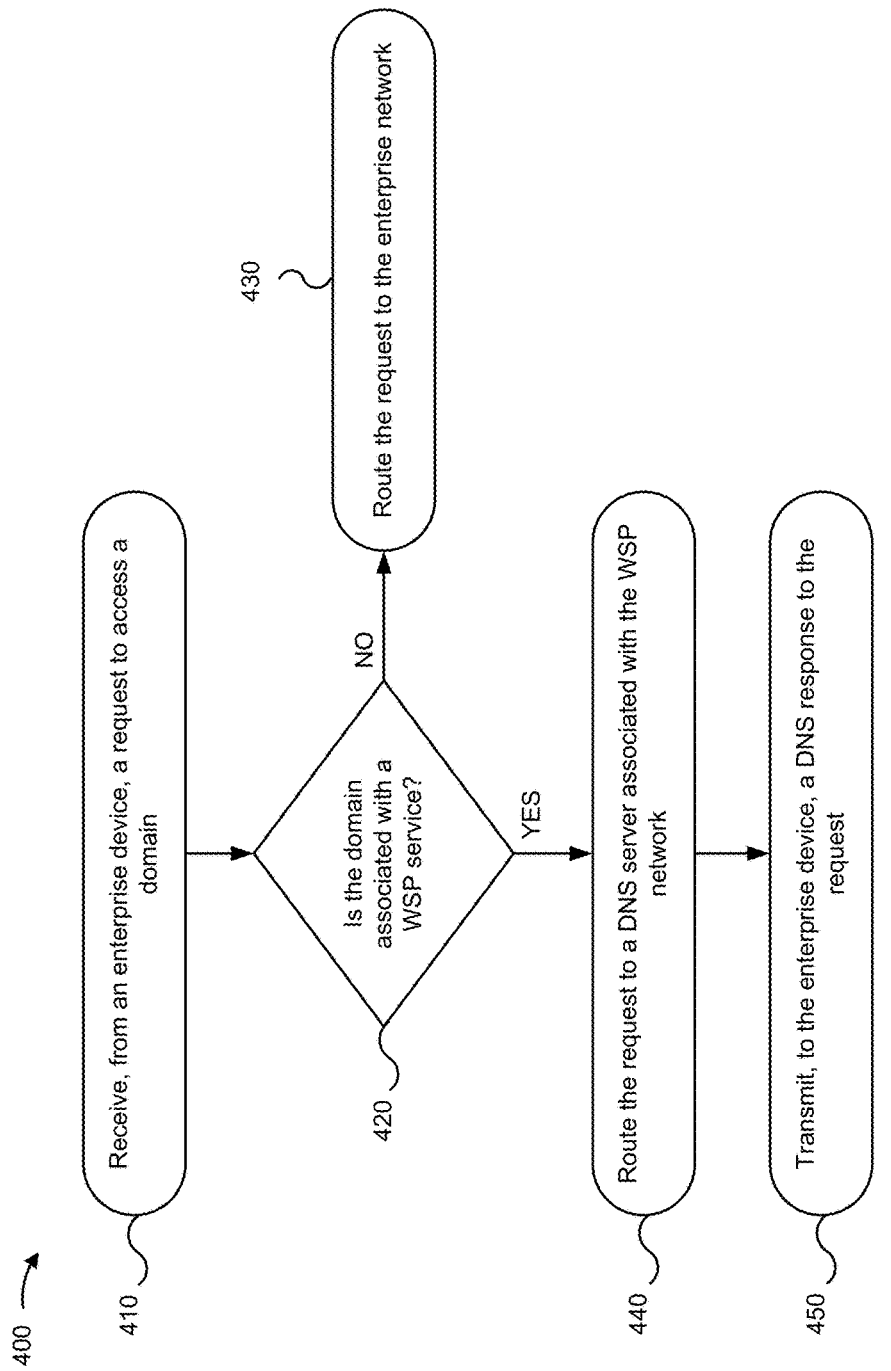
FIG. 4 is a flow chart of an example process for routing a domain name system (DNS) query from an enterprise device.

FIG. 4 is a flow chart of an example process 400 for routing a domain name system (DNS) query received from an enterprise device. In some implementations, one or more process blocks of FIG. 4 may be performed by WSP gateway 225. Additionally, or alternatively, one or more process blocks of FIG. 4 may be performed by another device or a group of devices separate from or including WSP gateway 225, such as base station 210, WSP DNS server 230, and/or WSP router 235.

As shown in FIG. 4, process 400 may include receiving, from an enterprise device, a request to access a domain (block 410). For example, WSP gateway 225 may receive a domain name system (DNS) query from enterprise device 205 (e.g., via base station 210). The DNS query may include information that identifies a domain (e.g., a network domain). For example, the DNS query may include information that identifies a domain name and/or a uniform resource locator (URL), such as www.example.com or www.example.com/website. WSP gateway 225 may determine the domain (e.g., the second-level domain "example") based on the domain name and/or the URL. In some implementations, WSP gateway 225 may determine a fully qualified domain name (FQDN) (e.g., an FQDN assigned to a device and/or to a WSP service), a second level domain, a third-level domain, and/or any other domain level.

As further shown in FIG. 4, process 400 may include determining whether the domain is associated with a WSP service (block 420). For example, WSP gateway 225 may determine whether the domain identifies and/or is associated with a WSP domain and/or a WSP service. In some implementations, WSP gateway 225 may access a data structure that indicates whether the domain is a WSP domain and/or is associated with a WSP service. For example, the data structure may include a list of WSP domains. WSP gateway 225 may determine whether the domain identified in the received request is listed in the data structure to determine whether the domain is associated with a WSP service.

Additionally, or alternatively, the WSP service may include a third party service, such as a service provided via third party server 250. WSP gateway 225 may determine that the domain identifies and/or is associated with a third party domain and/or a third party service. In some implementations, WSP gateway 225 may access a data structure that indicates whether the domain identifies a third party domain and/or is associated with a third party service. For example, the data structure may include a list of third party domains. WSP gateway 225 may determine whether the domain identified in the received request is listed in the data structure to determine whether the domain is associated with a third party service. The data structure that identifies third party domains may be the same or different from the data structure that identifies WSP domains. The information stored by the data structure(s) may be modified by a user and/or a device.

If the domain is not associated with a WSP service (block 420—NO), then process 400 may include routing the request to the enterprise network (block 430). For example, if WSP gateway 225 determines that the domain is not associated with a WSP service (or a third party service), then WSP gateway 225 may route the request identifying the domain to WSP router 235. WSP router 235 may route the request to enterprise router 255, which may route the request to enterprise DNS server 260 to respond to (e.g., to resolve) the request. Enterprise router 255 may receive a response to the DNS query from enterprise DNS server 260, and may route the response to enterprise device 205 (e.g., via WSP router 235, WSP gateway 225, and/or base station 210).

If the domain is associated with a WSP service (block 420—YES), then process 400 may include routing the request to a DNS server associated with the WSP network (block 440), and transmitting, to the enterprise device, a DNS response to the request (block 450). For example, if WSP gateway 225 determines that the domain is associated with a WSP service, then WSP gateway 225 may route the request identifying the domain to WSP DNS server 230. WSP DNS server 230 may respond to (e.g., may resolve) the request. For example, WSP DNS server 230 may receive a DNS query, may determine a network address (e.g., an IP address) associated with the DNS query, and may transmit a DNS response that identifies the network address to WSP gateway 225. WSP gateway 225 may transmit the DNS response to enterprise device 205 (e.g., via base station 210). The network address may identify a destination device to provide the WSP service requested by enterprise device 205. For example, the network address may identify WSP server 240.

Additionally, or alternatively, the WSP service may include a third party service, such as a service provided via third party server 250. If WSP gateway 225 determines that the domain is associated with a third party service, then WSP gateway 225 may route the request identifying the domain to WSP DNS server 230. WSP DNS server 230 may respond to the request by transmitting a DNS response that identifies a network address, associated with the request, to enterprise device 205 (e.g., via WSP gateway 225 and/or base station 210). In some implementations, the network address may identify third party server 250.

While a series of blocks has been described with regard to FIG. 4, the blocks and/or the order of the blocks may be modified in some implementations. Additionally, or alternatively, non-dependent blocks may be performed in parallel.

Figure 5:
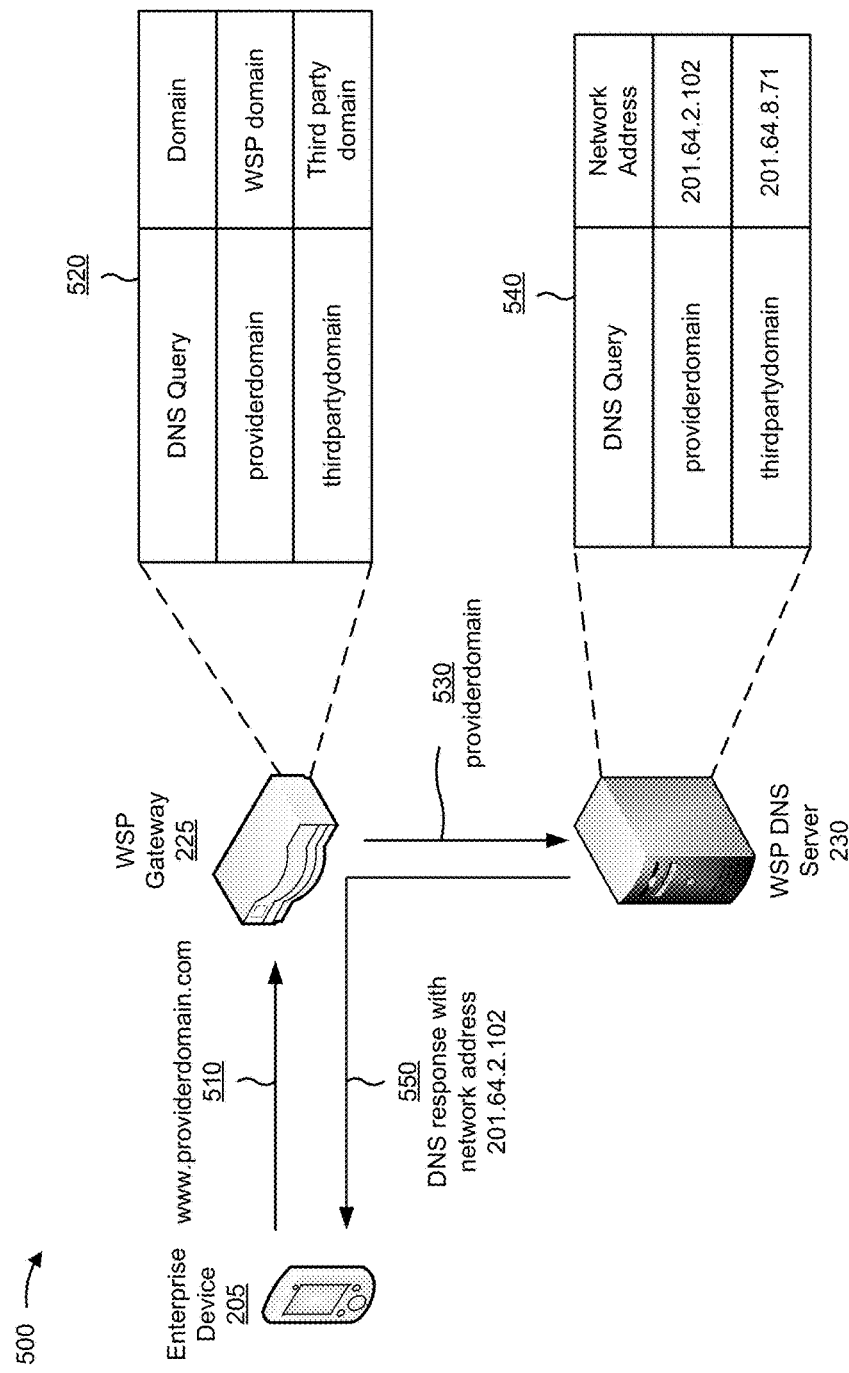
FIG. 5 is a diagram of an example implementation relating to the example process shown in FIG. 4.

FIG. 5 is a diagram of an example implementation 500 relating to example process 400 shown in FIG. 4. FIG. 5 shows example implementation 500 where WSP gateway 225 routes a DNS request for a WSP service, and routes a DNS response to the DNS request.

As shown by reference number 510, enterprise device 205 may transmit, and WSP gateway 225 may receive, information that identifies a DNS query, such as a request to access www.providerdomain.com. WSP gateway 225 may determine a domain associated with the DNS query (e.g., "providerdomain"). WSP gateway 225 may determine whether the domain is stored in a data structure that stores domains associated with WSP services. For example, as shown by reference number 520, WSP gateway 225 may determine that "providerdomain" is a WSP domain (e.g., is associated with a WSP service).

Based on determining that "providerdomain" is a WSP domain, WSP gateway 225 may transmit information that identifies the DNS query to WSP DNS server 230. For example, as shown by reference number 530, WSP gateway 225 may transmit information that identifies the domain "providerdomain" to WSP DNS server 230. WSP DNS server 230 may access a data structure to determine a network address (e.g., an IP address) associated with the DNS query. For example, as shown by reference number 540, WSP DNS server 230 may determine that an IP address "201.64.2.102" identifies a destination device (e.g., WSP server 240) that provides the WSP service associated with the domain "providerdomain." As shown by reference number 550, WSP DNS server 230 may transmit a DNS response that identifies the network address "201.64.2.102" to enterprise device 205 (e.g., via WSP gateway 225). Enterprise device 205 may transmit a request, for a WSP service, that includes the network address. For example, enterprise device 205 may transmit, to WSP gateway 225 and via base station 210, a packet that identifies the network address, as described herein in connection with FIGS. 6 and 7.

Figure 6:
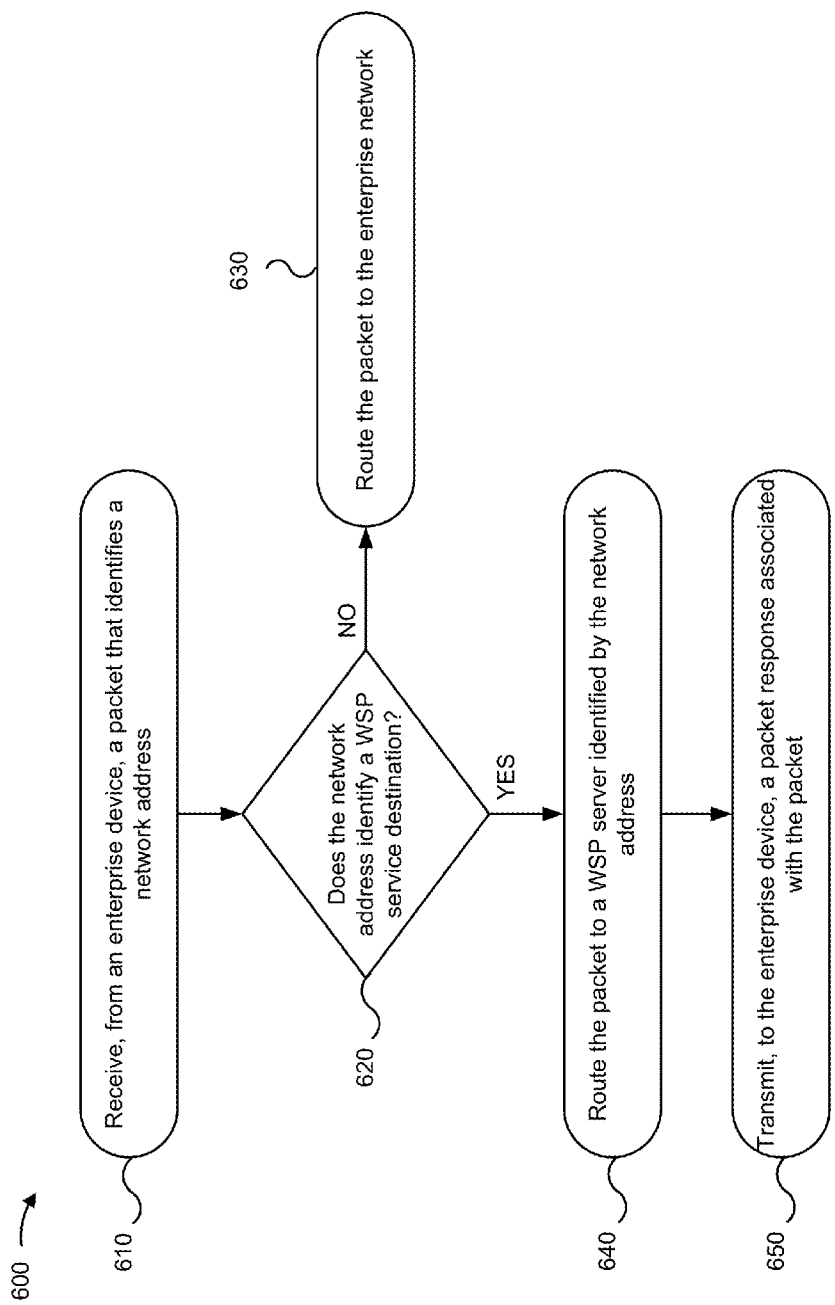
FIG. 6 is a flow chart of an example process for routing a packet received from an enterprise device.

FIG. 6 is a flow chart of an example process 600 for routing a packet received from an enterprise device. In some implementations, one or more process blocks of FIG. 6 may be performed by WSP router 235. Additionally, or alternatively, one or more process blocks of FIG. 6 may be performed by another device or a group of devices separate from or including WSP router 235, such as base station 210, WSP gateway 225 and/or WSP server 240.

As shown in FIG. 6, process 600 may include receiving, from an enterprise device, a packet that identifies a network address (block 610). For example, WSP router 235 may receive a packet, identifying a network address, from enterprise device 205 (e.g., via base station 210 and/or WSP gateway 225). The network address may include a network address identified in a DNS response transmitted to enterprise device 205 (e.g., discussed herein in connection with FIGS. 4 and 5). For example, the network address may include an IP address.

As further shown in FIG. 6, process 600 may include determining whether the network address identifies a destination associated with a WSP service (block 620). For example, WSP router 235 may determine whether the network address identifies and/or is associated with a WSP service and/or a destination in the WSP network, such as WSP server 240. In some implementations, WSP router 235 may access a data structure that indicates whether the network address identifies a WSP device (e.g., a device in WSP network 215, such as WSP server 240). For example, the data structure may include a list of WSP devices and associated network addresses of the WSP devices. WSP router 235 may determine whether the network address identified in the received packet is listed in the data structure to determine whether the network address is associated with a WSP service. In some implementations, WSP router 235 may determine whether the network address identifies a destination associated with a WSP service based on a subnet identified by the network address.

Additionally, or alternatively, the WSP service may include a third party service, such as a service provided via third party server 250. WSP router 235 may determine whether the network address identifies and/or is associated with a third party service and/or a destination in a third party network, such as third party server 250. In some implementations, WSP router 235 may access a data structure that indicates whether the network address identifies a third party device (e.g., a device in the third party network, such as third party server 250). For example, the data structure may include a list of third party devices and associated network addresses of the third party devices. WSP router 235 may determine whether the network address identified in the received packet is listed in the data structure to determine whether the network address is associated with a third party service. The data structure that identifies third party devices may be the same or different from the data structure that identifies WSP devices. The information stored by the data structure(s) may be modified by a user and/or a device.

If the network address is not associated with a WSP service (block 620—NO), then process 600 may include routing the packet to the enterprise network (block 630). For example, if WSP router 235 determines that the network address is not associated with a WSP service (or a third party service), then WSP router 235 may route the packet identifying the network address to enterprise router 255, which may route the packet to enterprise server 265 to transmit a packet response (e.g., a packet acknowledgement, a service provided in response to the packet, etc.) associated with the packet. Enterprise router 255 may receive the packet response, and may route the packet response to enterprise device 205 (e.g., via WSP router 235, WSP gateway 225, and/or base station 210).

If the network address is associated with a WSP service (block 620—YES), then process 600 may include routing the packet to a WSP server identified by the network address (block 640), and transmitting, to the enterprise device, a packet response associated with the packet (block 650). For example, if WSP router 235 determines that the network address is associated with a WSP service, then WSP router 235 may route the packet identifying the network address to WSP server 240 identified by the network address. WSP server 240 may transmit a packet response, associated with the packet, to enterprise device 205 (e.g., via WSP router 235, WSP gateway 225, and/or base station 210). The packet response may include a packet acknowledgement, a response associated with information requested by enterprise device 205 that transmitted the packet, a response that provides the WSP service requested by enterprise device 205, and/or another response associated with the packet received by WSP server 240.

Additionally, or alternatively, the WSP service may include a third party service, such as a service provided via third party server 250. If WSP router 235 determines that the network address is associated with a third party service, then WSP gateway 235 may route the packet identifying the network address to third party router 245, which may route the packet to third party server 250 identified by the network address. Third party server 250 may transmit a packet response, associated with the packet, to enterprise device 205 (e.g., via third party router 245, WSP router 235, WSP gateway 225, and/or base station 210).

While a series of blocks has been described with regard to FIG. 6, the blocks and/or the order of the blocks may be modified in some implementations. Additionally, or alternatively, non-dependent blocks may be performed in parallel.

Figure 7:
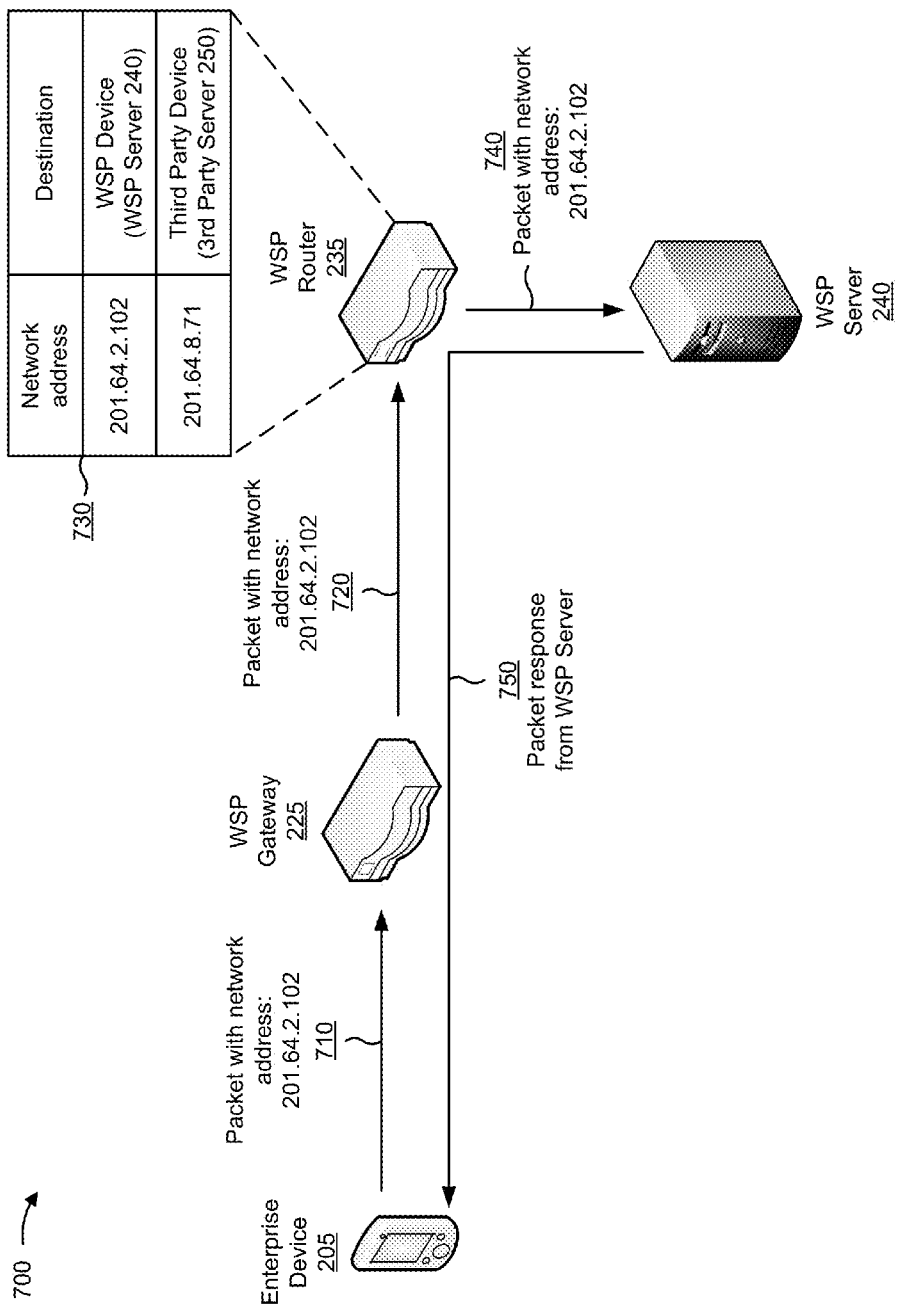
FIG. 7 is a diagram of an example implementation relating to the example process shown in FIG. 6.

FIG. 7 is a diagram of an example implementation 700 relating to example process 600 shown in FIG. 6. FIG. 7 shows example implementation 700 where WSP router 235 routes a packet associated with a WSP service, and routes a packet response associated with the packet.

As shown by reference number 710, enterprise device 205 may transmit, and WSP gateway 225 may receive, a packet that identifies a network address, such as the IP address "201.64.2.102." As shown by reference number 720, WSP gateway 225 may route the packet to WSP router 235. WSP router 235 may determine a destination associated with the network address. WSP router 235 may determine whether the network address is stored in a data structure that stores network addresses associated with WSP services. For example, as shown by reference number 730, WSP router 235 may determine that "201.64.2.102" identifies WSP server 240, which is associated with WSP network 215 and provides a WSP service.

Based on determining that the network address "201.64.2.102" identifies a WSP device (e.g., a device in WSP network 215), WSP router 235 may transmit the packet to the identified device. For example, WSP router 235 may determine that the network address "201.64.2.102" identifies WSP server 240 as a destination, and WSP router 235 may route the packet to WSP server 240, as shown by reference number 740. As shown by reference number 750, WSP server 240 may transmit a response, associated with the packet, to enterprise device 205 (e.g., via WSP router 235 and/or WSP gateway 225).

FIG. 8 is a diagram of an example call flow 800 for providing a WSP service to an enterprise device.

As shown by reference number 805, call flow 800 may include transmitting, by enterprise device 205 and to WSP gateway 225, a DNS query associated with a WSP service. As shown by reference number 810, call flow 800 may include determining, by WSP gateway 225, that the DNS query is associated with a WSP domain. As shown by reference number 815, call flow 800 may include transmitting, by WSP gateway 225 and to WSP DNS server 230, the DNS query. As shown by reference number 820, call flow 800 may include transmitting, by WSP DNS server 230 and to enterprise device 205 via WSP gateway 225, an IP address that identifies WSP server 240 that provides the WSP service identified by the DNS query.

As shown by reference number 825, call flow 800 may include transmitting, by enterprise device 205 and to WSP gateway 225, a packet identifying the IP address received by enterprise device 205 from WSP DNS server 230 via WSP gateway 225. As shown by reference number 830, call flow 800 may include transmitting, by WSP gateway 225 and to WSP router 235, the packet identifying the IP address. As shown by reference number 835, call flow 800 may include determining, by WSP router 235, a particular WSP server 240 identified by the IP address. As shown by reference number 840, call flow 800 may include transmitting, by WSP router 235 and to the particular WSP server 240, the packet. As shown by reference number 845, call flow 800 may include transmitting, by the particular WSP server 240 and to enterprise device 205 via WSP router 235 and WSP gateway 225, a WSP service response associated with the packet.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more devices to:
  receive, from an enterprise device, a request to access a network domain;
  determine whether the network domain is associated with a wireless service provider service; and
    based on determining that the network domain is not associated with the wireless service provider service:
      route the request to a private network associated with the enterprise device, or
    based on determining that the network domain is associated with the wireless service provider service:
      route the request to a domain name system server associated with the wireless service provider,
      receive a domain name system response to the request, the domain name system response identifying a network address, and
      route the domain name system response to the enterprise device.

2. The system of claim 1, where the one or more devices, when receiving the request to access the network domain, are further to:
  receive the request from the enterprise device via a base station.

3. The system of claim 1, where the one or more devices, when routing the domain name system response to the enterprise device, are further to:
  route the domain name system response to the enterprise device via a base station.

4. The system of claim 1, where the one or more devices, when determining whether the network domain is associated with a wireless service provider service, are further to:
  access a data structure that stores information identifying network domains that are associated with the wireless service provider service; and
  determine whether the network domain is associated with the wireless service provider service based on accessing the data structure.

5. The system of claim 1, where the wireless service provider service includes at least one of:
  a location service;
  a voicemail service;
  a messaging service; or
  a third party service.

6. The system of claim 1, where the one or more devices are further to:
  receive, from the enterprise device, a packet that identifies the network address;
  determine whether the network address is associated with a wireless service provider device that provides the wireless service provider service; and
    based on determining that the network address is not associated with the wireless service provider device:
      route the packet to the private network associated with the enterprise device, or
    based on determining that the network address is associated with the wireless service provider device:
      route the packet to the wireless service provider device identified by the network address,
      receive a packet response associated with the packet, and
      route the packet response to the enterprise device.

7. The system of claim 6, where the one or more devices, when determining whether the network address is associated with a wireless service provider device, are further to:
  access a data structure that stores information identifying network addresses that are associated with the wireless service provider device; and
  determine whether the network address is associated with the wireless service provider device based on accessing the data structure.

8. The system of claim 6, where the one or more devices, when receiving the packet that identifies the network address from the enterprise device, are further to:
  receive the packet from the enterprise device via a base station and a wireless network gateway.

9. The system of claim 6, where the one or more devices, when routing the packet response to the enterprise device, are further to:
  route the packet response to the enterprise device via a wireless network gateway and a base station.

10. A system, comprising:
one or more devices to:
  receive, from an enterprise device, a packet that identifies a network address;
  determine whether the network address is associated with a wireless service provider device that provides a wireless service provider service; and
    based on determining that the network address is not associated with the wireless service provider device:
      route the packet to a private network associated with the enterprise device, or
    based on determining that the network address is associated with the wireless service provider device:
      route the packet to the wireless service provider device identified by the network address,
      receive a packet response associated with the packet, and
      route the packet response to the enterprise device.

11. The system of claim 10, where the one or more devices, when determining whether the network address is associated with a wireless service provider device, are further to:
  access a data structure that stores information identifying network addresses that are associated with the wireless service provider device; and
  determine whether the network address is associated with the wireless service provider device based on accessing the data structure.

12. The system of claim 10, where the one or more devices, when receiving the packet that identifies the network address from the enterprise device, are further to:
  receive the packet from the enterprise device via a base station and a wireless network gateway.

13. The system of claim 10, where the one or more devices, when routing the packet response to the enterprise device, are further to:
  route the packet response to the enterprise device via a wireless network gateway and a base station.

14. The system of claim 10, where the wireless service provider service includes at least one of:
  a location service;
  a voicemail service;
  a messaging service; or
  a third party service.

15. The system of claim 10, where the one or more devices are further to:
- receive, from the enterprise device, a request to access a network domain;
- determine whether the network domain is associated with the wireless service provider service; and
  - based on determining that the network domain is not associated with the wireless service provider service:
    - route the request to the private network associated with the enterprise device; or
  - based on determining that the network domain is associated with the wireless service provider service:
    - route the request to a domain name system server associated with the wireless service provider,
    - receive a domain name system response to the request, the domain name system response identifying the network address, and
    - route the domain name system response to the enterprise device.

16. The system of claim 15, where the one or more devices, when determining whether the network domain is associated with a wireless service provider service, are further to:
- access a data structure that stores information identifying network domains that are associated with the wireless service provider service; and
- determine whether the network domain is associated with the wireless service provider service based on accessing the data structure.

17. A method, comprising:
- receiving, by a wireless network gateway and from an enterprise device, a request to access a network domain;
- determining, by the wireless network gateway, whether the network domain is associated with a wireless service provider service; and
  - based on determining that the network domain is not associated with the wireless service provider service:
    - routing, by the wireless network gateway, the request toward a private network, associated with the enterprise device, or
  - based on determining that the network domain is associated with the wireless service provider service:
    - routing, by the wireless network gateway, the request to a domain name system server associated with the wireless service provider service,
    - receiving, by the wireless network gateway, a domain name system response to the request, the domain name system response identifying a network address, and
    - routing, by the wireless network gateway, the domain name system response toward the enterprise device.

18. The method of claim 17, where determining whether the network domain is associated with a wireless service provider service further comprises:
- accessing a data structure that stores information identifying network domains that are associated with the wireless service provider service; and
- determining whether the network domain is associated with the wireless service provider service based on accessing the data structure.

19. The method of claim 17, further comprising:
- receiving, by the wireless network router and from the wireless network gateway, a packet that identifies the network address;
- determining, by the wireless network router, whether the network address is associated with a wireless service provider device that provides the wireless service provider service; and
  - based on determining that the network address is not associated with the wireless service provider device:
    - routing, by the wireless network router, the packet to the private network associated with the enterprise device, or
  - based on determining that the network address is associated with the wireless service provider device:
    - routing, by the wireless network router and to the wireless service provider device, the packet,
    - receiving, by the wireless network router, a packet response associated with the packet, and
    - routing, by the wireless network router and via the wireless network gateway and a base station, the packet response to the enterprise device.

20. The method of claim 19, where determining whether the network address is associated with a wireless service provider device further comprises:
- accessing a data structure that stores information identifying network addresses that are associated with the wireless service provider device; and
- determining whether the network address is associated with the wireless service provider device based on accessing the data structure.

* * * * *